Dec. 20, 1960   F. C. ARCHER   2,965,775
DYNAMO ELECTRIC MACHINES

Filed Aug. 15, 1958   6 Sheets-Sheet 3

INVENTOR
FREDERICK CHARLES ARCHER
BY Kuschstein, Kuschstein & Ottinger
ATTORNEYS Dec. 20, 1960 F. C. ARCHER 2,965,775
DYNAMO ELECTRIC MACHINES
Filed Aug. 15, 1958 6 Sheets-Sheet 6

INVENTOR
FREDERICK CHARLES ARCHER
BY
ATTORNEYS

United States Patent Office 2,965,775
Patented Dec. 20, 1960

2,965,775

DYNAMO ELECTRIC MACHINES

Frederick Charles Archer, Sutton Coldfield, England, assignor to The General Electric Company Limited, London, England Filed Aug. 15, 1958, Ser. No. 755,254

3 Claims. (Cl. 310—64)

This invention relates to dynomoelectric machines and is particularly concerned with cooling arrangements for the stator windings of such machines. In one such cooling arrangement the stator winding comprises coil side portions lying in slots in the stator core, and end winding portions joining the coil side portions at the respective ends of the machine, the conductors of the stator winding being of stranded form and including ducts for cooling fluid whereby to cool the winding.

It is one object of the present invention to provide an improved end winding arrangement whereby cooling connections between the coil side portions can be made in a relatively simple manner.

According to the present invention, in a dynamoelectric machine having a stator winding comprising coil side portions lying in slots in the stator core, and end winding portions joining said coil side portions at the respective ends of the machine, the conductors of the stator winding being of stranded form and including ducts for cooling fluid arranged to be connected with headers or the like by way of supply and discharge pipes whereby to cool the winding, cooling connections between said coil side portions are provided by preformed connecting tubes interleaved with the conducting strands of said end winding portions, the arrangement being such that the paths for cooling fluid are contained wholly within the insulation of the winding except at, or adjacent to, said supply and discharge pipes.

Preferably, cooling fluid is arranged to enter the ducts of the winding at a plurality of inlets and to be discharged from outlets situated substantially midway between the inlets. In one construction, at the outlets, all the ducts of a coil side portion are led through a single nose for connection to a header or the like, the conducting strands being led out through a second nose and transposed in any suitable manner.

Figure 1:
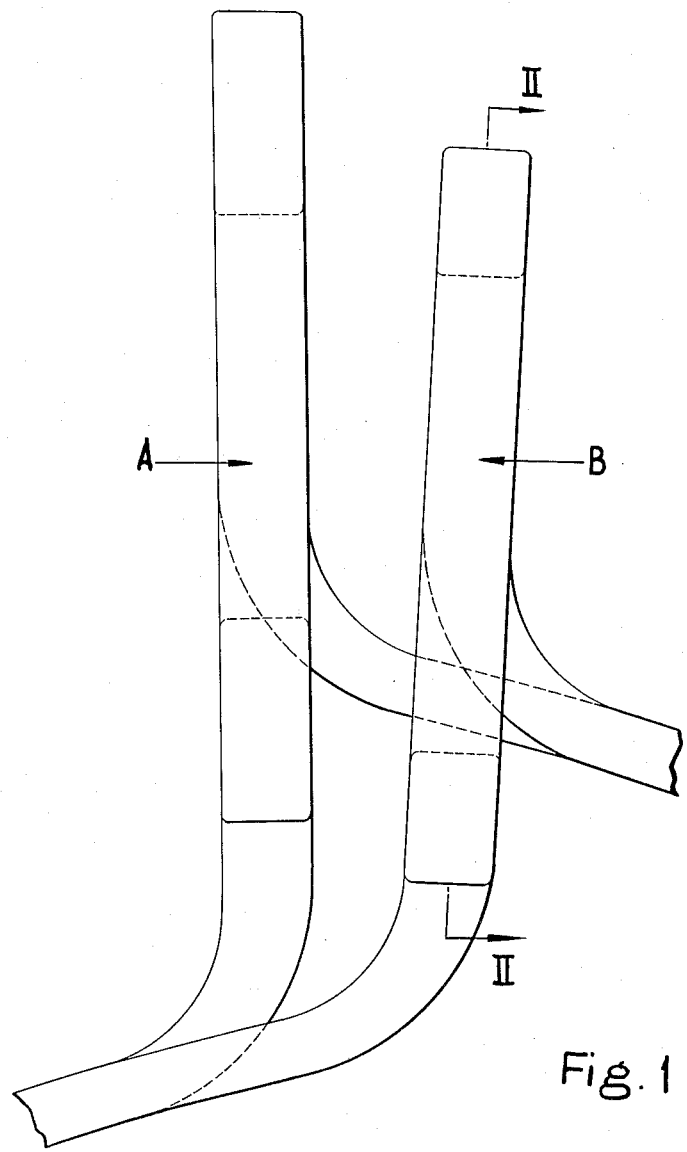
Figure 2:
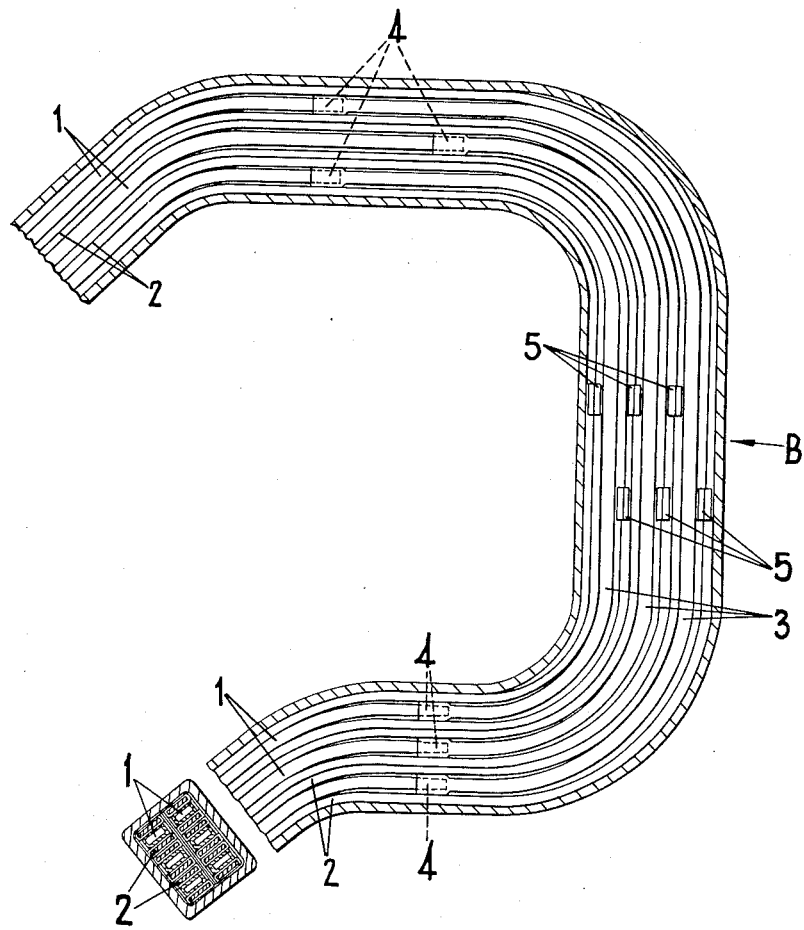
Figure 3:
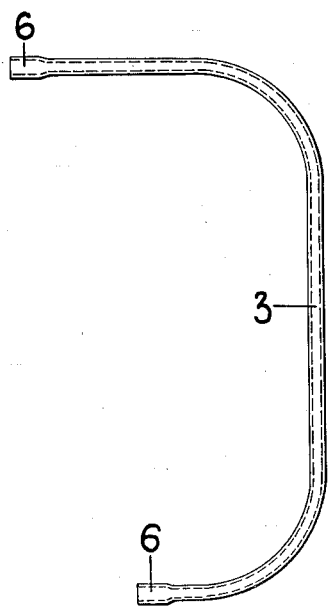
Figure 4:
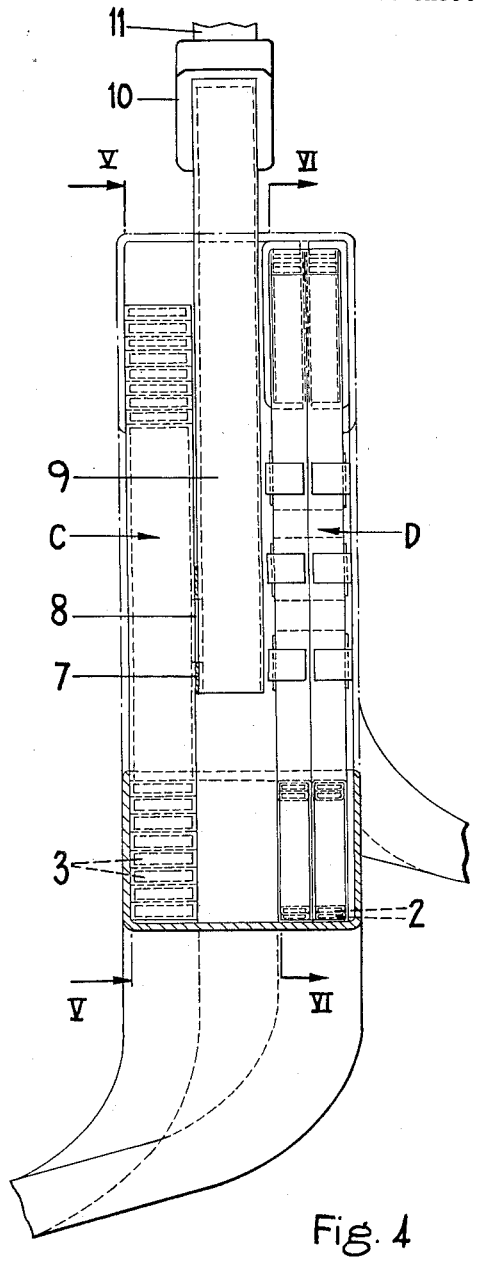
Figure 5:
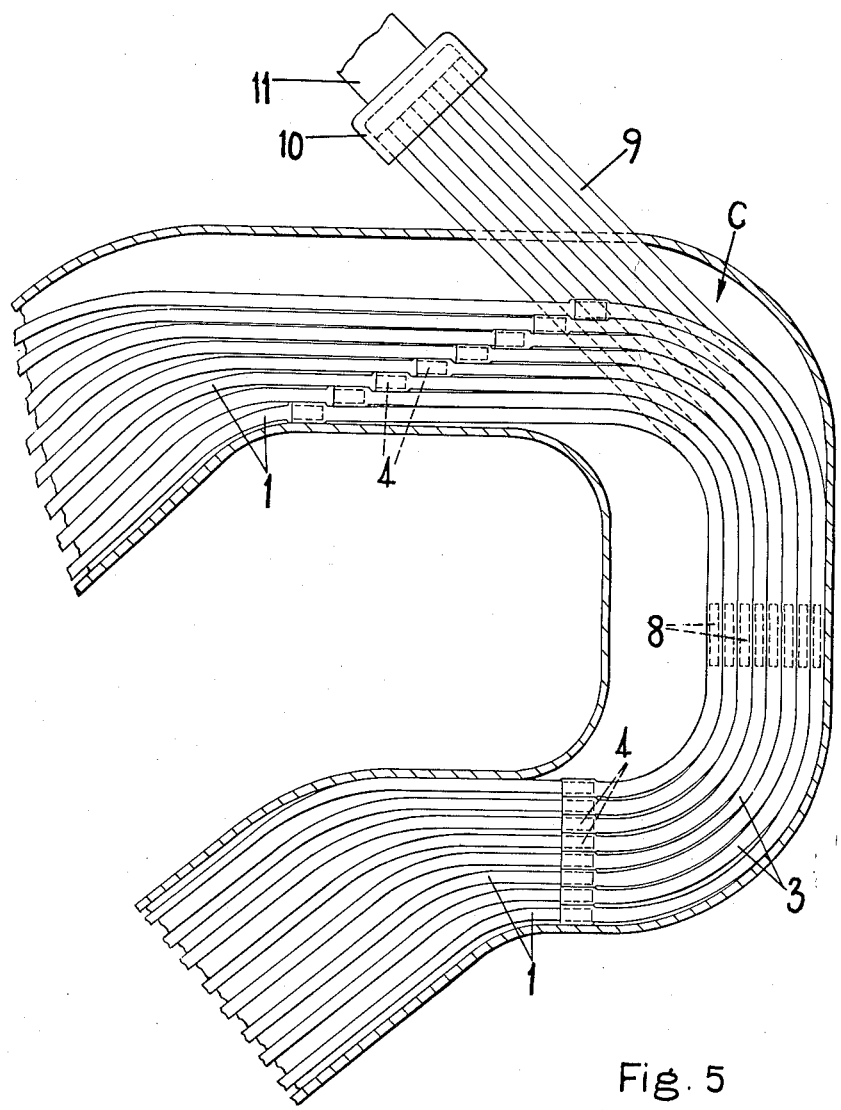
Figure 6:
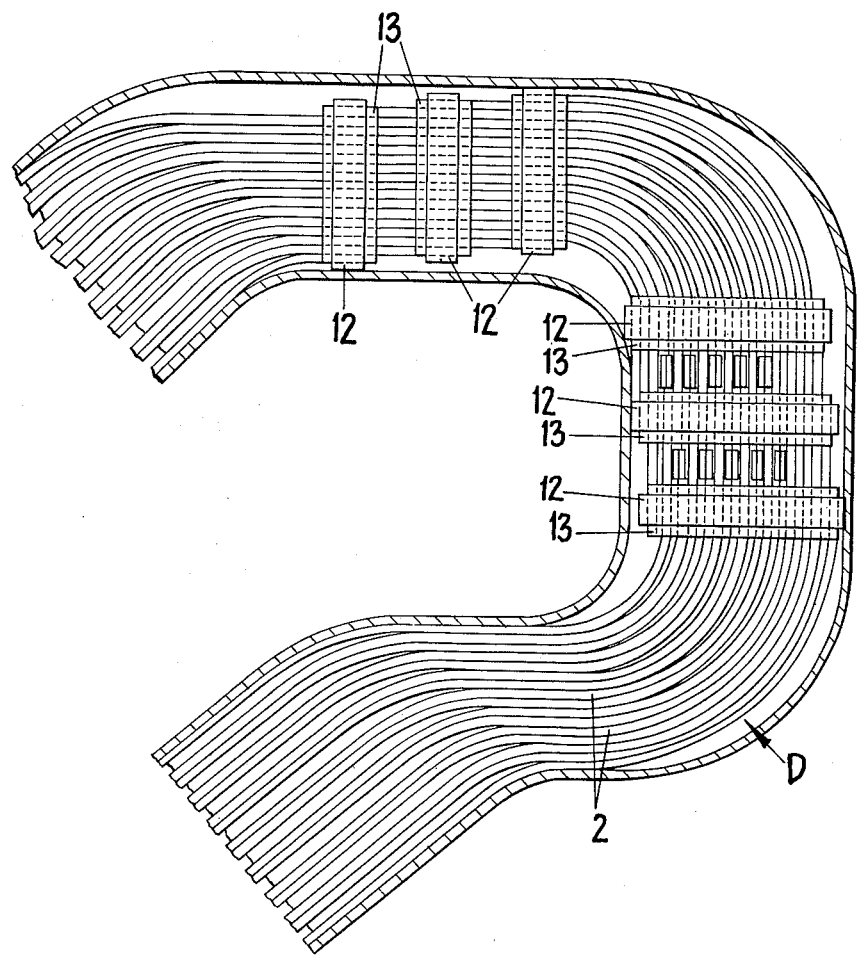
Figure 7:
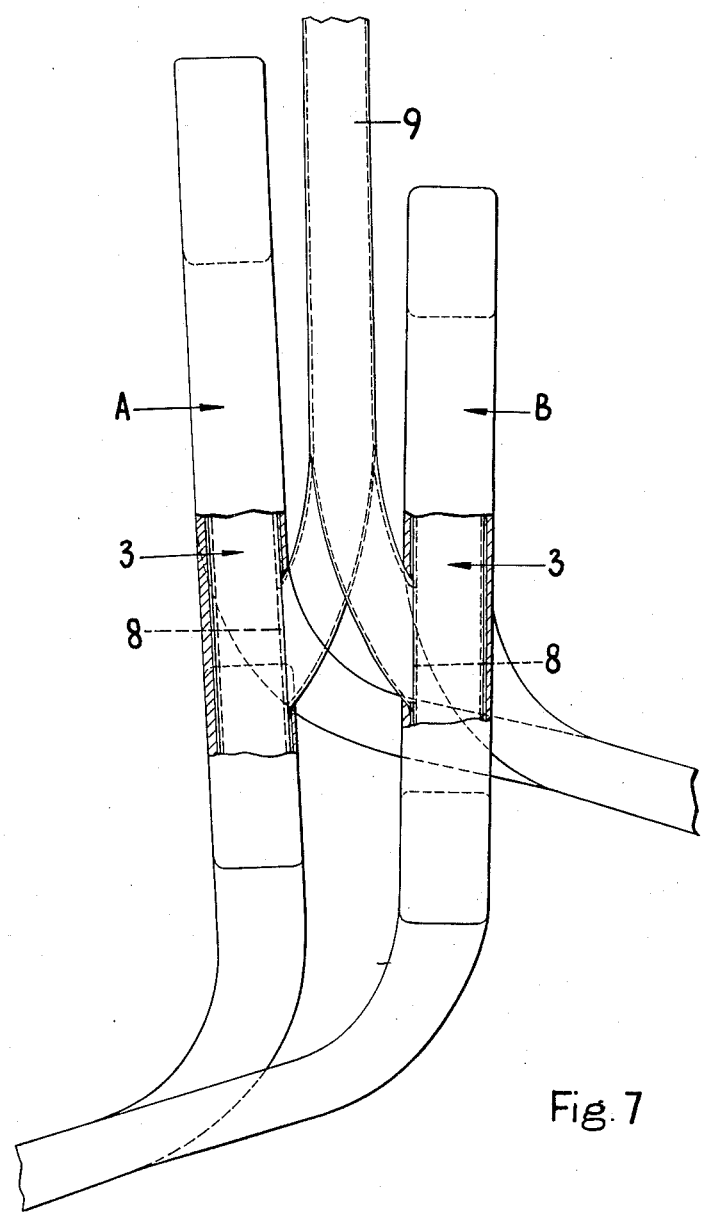

One construction of a cooling connection and two arrangements of this cooling connection at the water outlet of a turbo-alternator in accordance with the invention, will now be described by way of example with reference to the seven figures of the accompanying drawings in which Figure 1 shows a front elevation of the end connection of a stator phase winding of the alternator when no outlet connection is made, Figure 2 shows a sectional side elevation on the line II—II of Figure 1, Figure 3 shows a preformed connecting tube, in detail, as used in Figures 1 and 2, Figure 4 shows an arrangement of a cooling connection at a point where a water outlet is made from the preformed connecting tube, Figure 5 shows a sectional side elevation of the arrangement shown in Figure 4 on the line V—V, Figure 6 shows a sectional side elevation of the arrangement shown in Figure 4 on the line VI—VI and Figure 7 shows an alternative arrangement to that shown in Figure 4 of a cooling connection at a point where a water outlet is made from the preformed connecting tube. Like parts in all figures have been given similar references for simplicity.

Referring now to the drawings and particularly to Figures 1 and 2 thereof, the conductors of the phase windings of the stator member are of stranded form and are divided into a number of transposition units each consisting of a pair of copper tubes 1 of rectangular section lying side by side and serving as ducts for cooling fluid, and a lightly insulated copper strip 2 on either side of each tube 1.

Water is used as the cooling fluid and inlet connections to the conductors are situated at the line and neutral terminals of each phase winding, and water entering these inlets flows along four parallel paths, there being two parallel windings for each phase, and is discharged via outlet connections situated at the midphase point.

At the ends of each half coil the eight transposition units, each consisting of a pair of ducts and their associated conductor strips, are formed into two groups, one of five transpositions units A and the other of three units B. These two groups are displaced circumferentially to each other by one half slot pitch. The above-described cooling arrangements and displacement are shown in two articles, to wit, "Further Developments in the Design and Ventilation of Large Turbo-Alternators," published in the July issue of the G.E.C. Journal 1957 at pages 148 to 153, and "Direct Cooled Stator Windings," published in the "Electrical Review" of June 7, 1957, at pages 1065 and 1066. In order to make the necessary cooling connections between the ducts 1 of appropriate coil side portions the end of these ducts 1 are arranged parallel to the axis of the turbo-alternator and are joined in pairs of corresponding ducts by preformed connecting tubes 3 which are brazed onto the ends of the ducts 1. The brazed joints 4 at the end of each coil side portion may be staggered so that the arrangement is kept to a minimum size. The strips 2 of the coil side portions are transposed and brazed together, these brazed joints 5 also being staggered. It will be seen that with such an arrangement transposition of the conducting strips 2 is carried out in a neat and simple manner and the paths for cooling fluid are contained within the insulation of the conductors in the end winding portions besides the coil side portions, except, of course, where it is necessary to connect the ducts 1 to a water header.

Referring now to Figure 3 of the drawings the preformed tube 3 has its ends 6 expanded so that it can fit closely onto the ducts 1 to be connected, and the expanded ends 6 are preloaded with silver solder for brazing onto the ducts 1. The sides of the expanded ends 6 are slotted to ensure that the amount of solder at the joints 4 is kept to a minimum.

Referring now to Figures 4, 5 and 6, at the point in the winding where it is necessary to make a water outlet the preformed tube 3 and the strips 2 are not led round the end winding as described when referring to Figures 1 and 2 but the preformed tubes 3 are led round the end windings separate but parallel to the conducting strips 2, so that the two groups C, D are formed of separate components for the purpose of the end winding. One group C contains the eight preformed tubes 3, each of which have connected to a slot 8 in the side by means of brazing an outlet tube 9. The eight outlet tubes 9 terminate in an end cap 10 to which is connected an outlet nose 11 which discharge the water from the preformed tubes 9 and hence the winding ducts 1. The second group D is comprised entirely of conductors 2 and it allows the transposition of the conductors 2 to take place at the end connection as is more clearly shown in Figure 6 where the inner group of 10 conductors is connected to the outer group of 10 conductors and the outer group of 6 conductors is transposed to the inner group of 6 conductors, the latter transposition being effected by the use of jumpers 12 insulated by strips of insulating material 13 from the conductors not being transposed.

An alternative arrangement of connecting the water outlet tubes 9 is shown in Figure 7 where the end connection comprises two groups of preformed tubes 3 and conducting strips 2 as in Figure 1. The water outlet tubes 9 are placed between the two groups A and B the tubes 9 are connected to slots 8 in the preformed tubes 3 in a similar manner to that described in referring to Figures 4 and 5. This arrangement removes the necessity to make the conducting strips 2 separate from the cooling tubes 3 in the end connection and facilitates the forming of the coils.

I claim:

1. In a dynamoelectric machine including a stator core having axially extending slots, a stator winding arrangement comprising coil side portions lying in said slots and end winding portions joining said coil side portions at the respective ends of the stator core, means within the stator winding providing plural cooling fluid paths, headers, and means for supplying cooling fluid from said headers to said cooling paths, said coil side portions comprising stranded conductors and cooling fluid ducts interleaved therewith, said end winding portions comprising stranded conductors and preformed tubes interleaved therewith, said cooling fluid paths being constituted by said cooling fluid ducts and said preformed tubes, said means for supplying cooling fluid from headers to said cooling paths comprising supply and discharge pipes connecting said ducts with said headers and said cooling fluid paths being contained wholly within the normal insulation of the stator winding except at said supply and discharge pipes.

2. A stator winding arrangement as set forth in claim 1, wherein cooling fluid outlets for said cooling fluid ducts are situated substantially midway between a plurality of cooling fluid inlets.

3. A stator winding arrangement as set forth in claim 1, and including two noses, the first of said noses comprising an outlet for said cooling fluid ducts, the second nose comprising an electrical connection for said strands, said strands being transposed at said first nose, and said ducts being connected to said header after said cooling ducts have passed through said first nose.

References Cited in the file of this patent

UNITED STATES PATENTS 2,695,368    Kilbourne    Nov. 23, 1954

FOREIGN PATENTS 166,748    Australia    Feb. 1, 1956